INVENTOR.
JOHN TAMBERT
BY Adolph H. Martin
ATTORNEY

United States Patent Office 3,431,430
Patented Mar. 4, 1969

3,431,430
AUTOMATIC ELECTRIC CONTROL SYSTEMS
John Tambert, Detroit, Mich.
(P.O. Box 9921, Rochester, N.Y. 14623)
Filed Nov. 18, 1964, Ser. No. 412,130
U.S. Cl. 307—39     3 Claims
Int. Cl. H02j *3/00, 3/14;* H04l *9/00*

ABSTRACT OF THE DISCLOSURE

An electrical control system for energizing at random individual loads during the course of a repetitive programmed cycle. The ability of the system to make completely random and uncontrolled selections, renders it especially adaptable for use in quality control, psychological testing, generating random numbers and simulating random events.

---

This invention relates to automatic electrical control systems generally, and more particularly to a type of such system based upon random electrical pulses.

All electrical control systems presently in use are externally or man controlled, either simultaneously with the operation, or by pre-programming. None of the control systems employing known techniques, can provide a completely random sequence of actions which are nonpredictable. However, certain of the elaborate and costly digital electronic computers now in use employ pseudorandom numbers generated through the use of various mathematical artifices. While such numbers have proven to be extremely useful in making statistical analyses, sizeable errors are necessarily introduced in all computations based upon such pseudo-random numbers, rather than true random numbers.

The only known process by which true random numbers can be developed, is by resort to purely manual methods involving the use of dice, cards, roulette wheels and other such aids. These latter methods, while completely reliable, are both time consuming and costly, and are understandably unsuitable for incorporation into the complicated and fully automatic control or computer systems employed by industry, research, our armed forces and the other technologies in our automated society.

Cognizant of the shortcommings inherent in the control systems now in use employing such pseudo-random numbers, the applicant has as the primary object of his invention, the provision of an automatic electrical control system based upon the generation of true random numbers or random electrical pulses.

Another object of the invention is the provision of a system of the type previously described which is internally or self-controlled, and accordingly completely unpredictable.

A further object of the invention is the provision of a system of the type previously described which is relatively inexpensive to produce, and utilizes primarily standard electrical components.

Yet another object of the invention is to provide an electrical control system of the type previously described, which utilizes a timer devoid of any mechanical contacts, thereby eliminating substantially all maintenance problems and replacement costs.

Still another object of the invention is the provision of an electrical control system of the type previously described, which utilizes a timer that may be readily and conveniently adapted to provide a variety of accurately timed sequences and programs without the necessity of making any mechanical adjustments or settings.

A still further object of the invention is to provide a system for producing electrical pulses completely random in time, which may be utilized in operating or controlling systems and devices for making random selections and providing unpredictable timing sequences.

Additional features and advantages of the invention will become apparent after thorough consideration of a detailed discussion of the same composed with reference to the accompanying drawings constituting a portion of this application, and in which.

Figure 1:
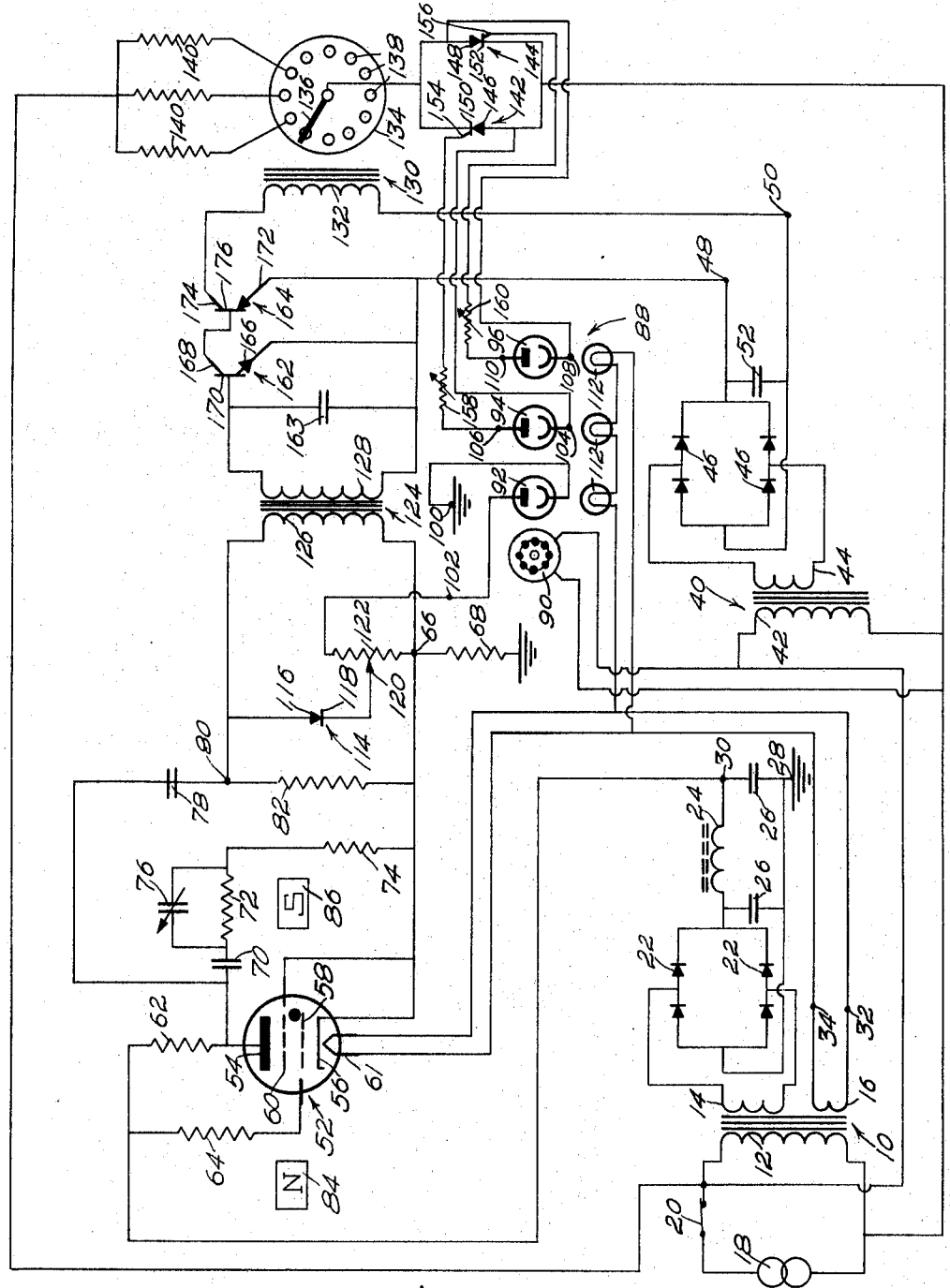
FIGURE 1 is a schematic electrical wiring diagram showing circuit details of the applicant's control system.
Figure 2:
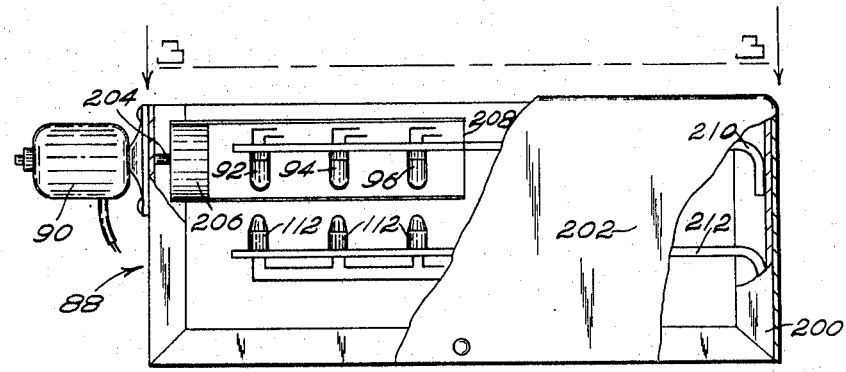
FIGURE 2 is a side elevation view of the applicant's cyclic timer, with portions of the box and removable cover broken away, showing the spaced support brackets mounted in the timer case.
Figure 3:
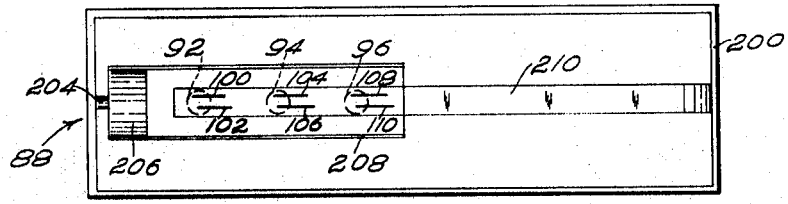
FIGURE 3 is a top plan view, taken substantially on plane 2—2 in FIGURE 1, with the cover removed from the box, showing relative locations of the transparent drum and mounting brackets in the timer case.

For a more detailed description of the invention, reference is made to FIGURE 1 of the drawings in which numeral 10 designates an electrical transformer having a primary winding 12, and a pair of secondary windings 14 and 16. The primary winding 12 is connected to a source of 60 cycle alternating current electrical potential 18 of approximately 120 volts, through a line switch 20. The secondary winding 14 is connected to four standard rectifiers 22 of the silicon type arranged to provide full wave rectification.

The direct current electrical output from the rectifiers 22 is connected through a pi filter consisting of a series inductance 24 having a magnitude of approximately 20 henrys, and a pair of 60 microfarad capacitors 26. One side of the output from the rectifiers 22 is connected to ground at 28, thereby providing a positive direct current electrical potential of approximately 175 volts at terminal 30. The secondary winding 16 of the transformer 10 provides an alternating current electrical potential of approximately 6.3 volts across terminals 32 and 34 for the purpose of energizing system components to be hereinafter described.

Another source of electrical power for the applicant's system is provided by a transformer 40 having a primary winding 42 and a secondary winding 44. The primary winding 42 is connected to the source of alternating current electrical potential 18 through the line switch 20. The secondary winding 44, provides an alternating current electrical potential of approximately 12.5 volts, and is connected directly to four standard rectifiers 46, preferably of the silicon type, arranged to provide full wave rectification.

The rectifiers 46 produce a direct current open circuit electrical potential of approximately 18 volts across terminals 48 and 50, which is filtered by a 1000 microfared capacitor 52. A random noise generator for the applicant's system consists of a small thyratron 52, such as a type 2D21, having a plate 54, a cathode 56, two grids 58 and 60 and a filament 61. The plate 54 of the thyratron 52 is connected to the 175 volts of direct current positive electrical potential of terminal 30, through a 27 kilohm resistor 62.

The first grid 58 of the thyratron 52 is connected through a 1 megohm resistor 64 to the 175 volts of direct current electrical potential of terminal 30. The cathode 56, and the second grid 60 of the thyratron 52 are both connected to a common terminal 66, which is grounded through a 2.2 kilohm resistor 68. The plate 54 of the thyratron 52 is further connected to a .01 microfarad condenser 70 which connects to the grounded terminal 66 through two resistors 72 and 74 having resistances of 1 megohm and 100 kilohms respectively.

A variable by-pass condenser 76, ranging from 2 to 7 picofarads, is connected across the 1 megohm resistor 72 in the plate circiut of the thyratron 52. The plate 54 is also connected to a .1 microfarad capacitor 78, which connects to an intermediate terminal 80 connected with the grounded terminal 66 through a 10 kilohm resistor 82. A permanent magnet, having north and south poles 84 and 86 respectively, provides a magnetic field within which the thyratron 52 operates.

A cyclic timer 88, for the applicant's automatic control system, has a suitable drive, such as an electric motor 90, and three low impedance photo cells 92, 94 and 96. The electric drive motor 90, for the cyclic timer 88, is connected to the source of alternating current electrical potential 18 through the line switch 20. The photo cell 92 has one of its leads connected directly to ground at 100, and the other lead attached to an intermediate terminal 102 for connection into the applicant's system in a manner to be described later.

The two remaining two photo cells 94 and 96 have their respective leads attached to terminals 104, 106 and 108 and 110 respectively. Three low voltage pre-focused light bulbs 112, serially connected across terminals 32 and 34, provide a separate source of light for each of the three photo cells 92, 94 and 96 of the cyclic timer 88. A switching diode 114, having an anode 116 and a cathode 118, is connected into the plate circuit of the thyratron 52. The anode 116 is connected directly to the intermediate terminal 80, and the cathode 118 connects to the selector arm 120 of a .15 megohm potentiometer 122.

The potentiometer 122 has one end thereof connected directly to the grounded terminal 66, and the other end connected to terminal 102 of the photo cell 92. A coupling transformer 124, having a primary winding 126 and a secondary winding 128, is connected into the plate circuit of the thyratron 52. One side of the primary winding 126 of the transformer 124 is connected directly to the intermediate terminal 80, and the other side connects to the grounded terminal 66.

A standard rotary electro-magnetic relay 130, has an operating coil 132 and a multi-pole switch 134. The multi-pole switch 134 has a selector arm 136, and an annular array of contacts 138. Pre-selected individual loads 140, may be connected between each of the contacts 138, and one side of a suitable source of electrical potential such as 18. The selector arm 136 of the multi-pole switch 134 is connected to the other side of the electrical potential 18 through a pair of silicon controlled rectifiers 142 and 144 connected in a parallel inverse manner so as to provide full wave alternating current control.

The rectifiers 142 and 144, together serve as an electronic switch for controlling the power supply for the loads 140 connected to the rotary electromagnetic relay 130. Each of the rectifiers 142 and 144 have respectively anodes 146 and 148, cathodes 150 and 152, and gates 154 and 156. The anode 146 of the rectifier 142 is connected directly to one terminal 104 of the photo cell 94. The gate 154 of the rectifier 142 is connected to the other terminal 106 of the photo cell 94 through an adjustable resistor 158.

The anode 148 of the rectifier 144 is connected directly to one terminal 108 of the photo cell 96. The gate 156 of the rectifier 144 is connected to the other terminal 110 of the photo cell 96 through an adjustable resistor 160. The cathode 150 of the rectifier 142, and the anode 148 of the rectifier 144, are both connected to the selector arm 136 of the multi-pole switch 134. The anode 146 of the rectifier 142, and the cathode 152 of the rectifier 144 are both connected to the other side of the electrical potential 18.

Another electrical switch for the applicant's electrical control system consists of two transistors 162 and 164. Transistor 162 is preferably of the switching type, such as a 2N1711, and transistor 164 is a power type unit, such as a 2N555. The transistor 162 must further be an NPN type having an emitter 166, a collector 168 and a base 170. The transistor 164 must be a PNP type also with an emitter 172, collector 174 and a base 176.

The emitters 166 and 172, of the two transistors 162 and 164 respectfully, are both connected to one side of the secondary winding 128 of the coupling transformer 124. The base 170 of the transistor 162 is connected directly to the other side of the secondary winding 128. The collector 168 of the transistor 162 connects directly to the base 176 of the transistor 164. The collector 174 of the transistor 164 is connected to one side of the operating coil 132 of the rotary electro-magnetic relay 130.

The other side of the operating coil 132 on the rotary relay 130, connects to terminal 50 thereby providing a source of direct current electrical potential. The other terminal 48 of such direct current electrical potential is connected to the emitters 166 and 172 of the transistors 162 and 164 respectively. A filtering condenser 163, having a capacity of 1.0 microfarad, is connected directly across the secondary winding 128 of the coupling transformer 124.

The preceding discussion completes a description of the circuit details relating to the applicant's automatic electrical control system as herein disclosed; however, to insure a more thorough comprehension and appreciation of the subject matter presented, a thorough discussion is now directed to the manner in which the system operates, and the various electrical components function so as to make possible the realization of the various objectives set forth in the introductory portion of this specification.

*Operation of control system*

In operation, the line switch 20 is moved to the closed or full line position shown in the schematic diagram of FIGURE 1. The primary winding 12 of the transformer 10 is thus energized by the electrical potential 18, thereby producing alternating current electrical potentials across the secondary windings 14 and 16 of approximately 125 volts and 6.3 volts respectively. The 125 volts of alternating current electrical potential is fed through the rectifiers 22 thereby producing a positive direct current electrical potential of approximately 175 volts at terminal 30.

This direct current electrical potential is impressed simultaneously on the two resistors 62 and 64. A voltage of sufficient magnitude is thus provided on the plate 54 and the first grid 58 of the thyratron 52, to cause ionization of the gas therein contained. Random movement of the gas ions thus produces an electrical current of random amplitude through the circuit of the plate 54. A voltage of random amplitude, commonly called noise, thereupon appears across the plate load resistor 62.

This random voltage however contains certain periodic components which are eliminated through use of a permanent magnet, having spaced poles 84 and 86 located as shown in FIGURE 1, which sets up a magnetic field along the direction of current flow between the plate 54 and cathode 56 of the thyratron 52. The random noise voltage present at the plate 54 is also fed through the capacitor 78 to the switching diode 114. The switching diode 114 is normally in an open condition, as the random noise voltage applied to the anode 116 has negative peaks which are more negative than the value of the bias voltage impressed on the cathode 118 through the potentiometer 122 and photo cell 92 thus blocking the diode 114.

However, the cyclic timer 88 is programmed to permit the photo cell 92 to be activated a pre-selected time at spaced intervals, thereby periodically changing the bias voltage on the cathode 118 of the diode 114. During such time intervals the random noise voltage occassionally becomes more positive than the bias voltage, thus allowing the switching diode 114 to close momentarily. Thereupon, the capacitor 78, which has been previously charged by the plate supply voltage, is provided a different series impedance. This transient switching produces electrical pulses of large amplitude which are completely random in time.

These random electrical pulses are then fed into the primary winding 126 of the coupling transformer 124 so as to provide a proper impedance match. The output from the secondary winding 128 of the coupling transformer 124 is filtered by the capacitor 163 to remove high frequency components before it reaches the two transistors 162 and 164 which act as an electronic switch. When a random electrical pulse is admitted to the transistor 162, the transistor 164 is thereupon triggered so as to conduct a current of sufficient magnitude from the power transformer 40 to activate the coil 132 and operate the rotary relay 130.

The selector arm 136 of the rotary relay 130 is thus caused to sweep in steps across the annular array of contacts 138 during such time as the coil 132 is receiving activating power pulses. When the cyclic timer 88 de-activates the photo cell 92, the switching diode interrupts the flow of random electrical pulses to the transistors 162 and 164 thus de-energizing the coil 132 of the rotary relay 130. The selector arm 136 thereupon comes to rest on one of the contacts 138, thus making a random and completely uncontrolled selection of a load 140.

Following a pre-determined or scheduled time lapse provided by the cyclic timer 88 in a manner to be described later, the photo cells 94 and 96 are activated thereby triggering the two silicon controlled rectifiers 142 and 144 acting as another electronic switch. Current is thus permitted to flow from the alternating current electrical potential 18 through the rectifiers 142 and 144, and the selector arm 136 of the rotary relay 130 to the load 140, selected at random as previously described.

After a pre-selected period of time, the cyclic timer 88 de-activates the two photo cells 94 and 96 thereby rendering the two rectifiers 142 and 144 non-conductive, and interrupting the flow of current through the rotary relay 130 to the selected load 140. Following another pre-determined or scheduled time lapse, the photo cell 92 is again activated thereby permitting random electrical pulses to reach the transistors 162 and 164 so as to operate the rotary relay 130, which then makes another completely random selection of a load 140 as previously described.

In practice, as it is not desirable to operate the rotary relay 130 while it is conducting current to a load 140, the cyclic timer 88 is programmed so that the two photo cells 94 and 96 trigger the two silicon controlled rectifiers 142 and 144 thereby causing them to conduct only after the other electronic switch, transistors 162 and 164, has become non-conductive. Likewise, the cyclic timer 88 permits activation of the photo cell 92, so as to render transistors 162 and 164 conductive only after rectifiers 142 and 144 have become non-conductive.

Construction of cyclic timer

The cyclic timer 88 has a light-tight case comprising a box 200 and a removable cover 202. The electric motor 90 for the cyclic timer 88 is detachably mounted on the box 200, and has a rotatable shaft 204 extending into the case. A hub 206 on the rotatable shaft 204 has thereon an open-end transparent drum 208. A pair of vertically spaced lateral brackets 210 and 212 are provided on the interior of the box 200. The upper bracket 210 extends into the transparent drum 208, and the lower bracket 212 is disposed directly therebelow outside the drum 208.

The three photo cells 92, 94 and 96, or other suitable light sending devices, are removably attached to the upper bracket 210 so as to be within the rotatable transparent drum 208. The three pre-focused light bulbs 112, are removably mounted on the lower bracket 212 so that a bulb 112 is disposed directly below each of the three photo cells 92, 94 and 96. A flat opaque film strip 214, for use in the transparent drum 208, has thereon a light transmitting pattern consisting of transparent areas such as 216 and 220.

Figure 5:
FIGURE 5 is an elevation view showing the film strip in FIGURE 4 rolled into a cylindrical shape with the transparent leader overlapping a portion of the opaque section.

A transparent leader 218 is provided across the entire width of the opaque film strip 214 to facilitate rolling it into a cylindrical shape, as illustrated in FIGURE 5 for insertion into the transparent drum 208. The opaque film strip 214 is preferably a negative obtained by photographing a pattern prepared to provide the desired timing program. In practice, film strips 214 may be prepared to provide a large variety of timing programs.

In this way the applicant's cyclic timer 88 could thus be readily adapted to provide any of the pre-selected programs by the simple expedient of inserting the previously prepared film strip 214 into the transparent drum 208. It is also possible to shape and cement the film strips 214 into a cylindrical sleeve for application to the external surface of the transparent drum 208. Should it be considered desirable, a series of drums 208 could also be prepared, each imprinted or perforated to provide a pre-selected timing program.

Any of such pre-selected programs could then be obtained by removing the entire drum 208 from the hub 206, and replacing it with a drum 208 providing the desired timing program. It may be preferable in some instances, to locate the light sensing devices 92, 94 and 96 outside the transparent drum 208, and place a single light source inside the transparent drum 208. In certain installations, it may also be expedient or necessary to equip the cyclic timer 88 with an externally controlled drive of a type which differs from that selected for use in the applicant's automatic electrical control system.

For certain purposes, a variable speed drive may be required, while in other instances, either an intermittent drive or a step type drive may prove desirable. However, these various modifications of the applicant's cyclic timer 88 are merely matters of choice or selection, and the choice in each instance will be dictated by the circumstances peculiar to each installation.

Operation of cyclic timer

In adapting the cyclic timer 88 for operation in the applicant's automatic electrical control system, a film strip 214 is first prepared in the manner previously described so as to provide the required timing program. Such a program is provided by the film strip 214 shown in FIGURE 4 which has a series of transparent areas 220 along one side thereof, disposed between the larger transparent areas 216 along the other side. To ready the film strip 214 for use, it is rolled into a cylindrical shape with the transparent leader 218 over-lapping the opaque portion, as shown in FIGURE 5.

The cylindrical film strip 214 is then inserted into the transparent drum 208 of the cyclic timer 88, and positioned so that the transparent areas 220 are disposed opposite the photo cell 92. The transparent areas 216 are thereupon automatically aligned with the photo cells 94 and 96. When the line switch 20, as shown in FIGURE 1, is moved to the closed or full line position, the electric motor 90 of the cyclic timer 88 is thereupon energized, and caused to rotate the transparent drum 208 in a clockwise direction as viewed from the open end.

Figure 4:
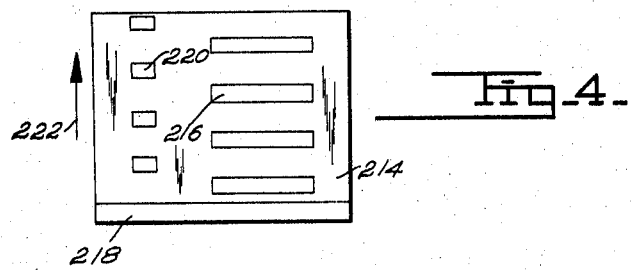
FIGURE 4 is a top plan view of a film strip for use with the applicant's cyclic timer, showing thereon a typical light transmitting pattern.

This rotation of the transparent drum 208 moves the film strip 214 in the direction of the arrow 222, as shown in FIGURE 4, thereby causing the transparent areas 220 and 216 on the film strip 214 to pass beneath the photo cells 92 and 94 and 96 respectively. Simultaneous with the energizing of the electric motor 90 on the cyclic timer 88, the filaments of the three individual pre-focused light bulbs 112 are energized by the low voltage electrical potential 16. The transparent areas 220 and 216 will thus be alternately placed in a position to transmit light to their associated photo cells, 92, and 94 and 96 respectively.

Therefore, photo cell 92 will be activated only while photo cells 94 and 96 remain inactive; conversely, photo cells 94 and 96 are activated only while photo cell 92 is inactive. Relating this operation to the applicant's automatic electrical control system, it is apparent that the timing program provided by the film strip in FIGURE 4 will prevent the electronic switch consisting of rectifiers 142 and 144 from being closed simultaneously with the other electronic switch comprising transistors 162 and 164.

Based upon the foregoing discussion, the applicant is of the opinion that his invention has fulfilled a long-felt need in the field of automatic electrical control systems, and that he has accordingly made a valuable and significant contribution to the related art. However, while the invention was described in detail with reference to only a limited number of embodiments, it will be appreciated by those familiar with the art that the principles involved are susceptible of numerous other practical applications and adaptations.

Therefore, I claim as new and desire to secure by Letters Patent:

1. A random control electrical system comprising a multi-pole switch for selective connection to individual loads, a first electronic switch controlling operation of the multi-pole switch, a source of random electrical pulses for triggering the first electronic switch, switching means controlling the flow of random electric pulses to the first electronic switch, a multi-circuit cyclic timer controlling the switching means, such cyclic timer being programmed to permit the switching means to pass a random pulse of a pre-selected magnitude at spaced time intervals thereby closing the first electronic switch and operating the multi-pole switch so that it makes a completely uncontrolled selection of an individual load, and a second electronic switch for connecting the individual load selected by the multi-pole switch to a source of electrical potential, such cyclic timer also controlling the second electronic switch, triggering the same to close after the switching means is rendered inoperable by the timer, and causing the same to open before the switching means is again placed in condition to pass a random electrical pulse of sufficient magnitude to again close the first electronic switch.

2. A random control electrical system comprising a multi-pole switch for selective connection to individual loads, a first electronic switch controlling operation of the multi-pole switch, a source of random electrical pulses for triggering the first electronic switch such source of random electrical pulses comprising a thyratron operating in a magnetic field for producing electrical pulses of a fixed amplitude, and means for converting such electrical pulses into large amplitude pulses which are completely random in time, switching means controlling the flow of random electrical pulses to the first electronic switch, a multi-circuit cyclic timer controlling the switching means, such cyclic timer being programmed to permit the switching means to pass a random pulse of a pre-selected magnitude at spaced time intervals thereby closing the first electronic switch and operating the multi-pole switch so that it makes a completely uncontrolled selection of an individual load, and a second electronic switch for connecting the individual load selected by the multi-pole switch to a source of electrical potential, such cyclic timer also controlling the second electronic switch, triggering the same to close after the switching means is rendered inoperable by the timer, and causing the same to open before the switching means is again placed in condition to pass a random electrical pulse of sufficient magnitude to again close the first electronic switch.

3. A random control electrical system comprising a multi-pole switch for selective connection to individual loads, a first electronic switch consisting of a transistorized direct current amplifier controlling operation of the multi-pole switch, a thyratron operating in a magnetic field for generating random electrical pulses of a fixed amplitude for triggering the first electronic switch, means for converting the electrical pulses into large amplitude pulses which are completely random in time, switching means controlling the flow of random electrical pulses to the first electronic switch, a multi-circuit cyclic timer controlling the switching means, such cyclic timer being programmed to permit the switching means to pass a random pulse of a pre-selected magnitude at spaced time intervals thereby closing the first electronic switch and operating the multi-pole switch so that it makes a completely uncontrolled selection of an individual load, and a second electronic switch consisting of two silicon controlled rectifiers connected in a parallel inverse manner for connecting the individual load selected by the multi-pole switch to a source of electrical potential, such cyclic timer also controlling the second electronic switch, triggering the same to close after the switching means is rendered inoperable by the timer, and causing the same to open before the switching means is again placed in condition to pass a random electrical pulse of sufficient magnitude to again close the first electronic switch.

References Cited

UNITED STATES PATENTS

| | | | |
|---|---|---|---|
| 2,539,014 | 1/1951 | Frantz | 178—22 X |
| 2,738,498 | 3/1956 | Liebknecht | 178—22 X |
| 2,993,089 | 7/1961 | Negri | 178—22 |
| 3,278,903 | 10/1966 | Long et al. | 178—22 X |
| 3,291,908 | 12/1966 | Ehrat | 178—22 |

ROBERT K. SCHAEFER, *Primary Examiner.*

H. J. HOHAUSER, *Assistant Examiner.*

U.S. Cl. X.R.

178—22